United States Patent
Poirier et al.

(10) Patent No.: US 9,596,211 B2
(45) Date of Patent: *Mar. 14, 2017

(54) CLOUD BASED CUSTOMER PREMISES EQUIPMENT

(71) Applicant: Juniper Networks, Inc., Sunnyvale, CA (US)

(72) Inventors: Jason P. Poirier, Bedford, NH (US); Sudhir Krishnan, Acton, MA (US); Colby Barth, Collegeville, PA (US); John C. Scano, Dracut, MA (US); John Liddy, Gardner, MA (US); Sanjay Kalra, San Jose, CA (US); Mathias Kokot, West Medford, MA (US); Javier Aviles Blanco, Madrid (ES)

(73) Assignee: Juniper Networks, Inc., Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/186,118

(22) Filed: Jun. 17, 2016

(65) Prior Publication Data

US 2016/0301661 A1     Oct. 13, 2016

Related U.S. Application Data

(63) Continuation of application No. 13/520,500, filed as application No. PCT/ES2011/070917 on Dec. 30, 2011, now Pat. No. 9,374,267.

(51) Int. Cl.
| | |
|---|---|
| G06F 15/173 | (2006.01) |
| H04L 29/12 | (2006.01) |
| H04L 12/46 | (2006.01) |
| H04L 29/06 | (2006.01) |
| H04L 29/08 | (2006.01) |

(52) U.S. Cl.
CPC ...... *H04L 61/2582* (2013.01); *H04L 12/4641* (2013.01); *H04L 29/12405* (2013.01);
(Continued)

(58) Field of Classification Search
CPC ............. H04L 61/2528; H04L 61/2592; H04L 29/12405; H04L 29/1275; H04L 61/2015; H04L 12/4641
See application file for complete search history.

(56) References Cited

U.S. PATENT DOCUMENTS

| 7,469,294 B1 | 12/2008 | Luo et al. |
| 8,117,317 B2 | 2/2012 | Klimentiev et al. |

(Continued)

FOREIGN PATENT DOCUMENTS

| EP | 2 482 502 A2 | 8/2012 |
| WO | WO 2011/144067 A2 | 11/2011 |

OTHER PUBLICATIONS

Vlaeminck, "Service Enablers for Converged IP Access Networks", Jan. 1, 2007, pp. 41-62, XP002382596.
(Continued)

*Primary Examiner* — Chris Parry
*Assistant Examiner* — Stephen Houlihan
(74) *Attorney, Agent, or Firm* — Harrity & Harrity, LLP

(57) ABSTRACT

Network (cloud) based customer premises equipment may receive, over a broadband access circuit, layer 2 traffic from an access device at a customer premises; provide dynamic host configuration protocol (DHCP) services for computing devices at the customer premises, the DHCP services providing Internet Protocol (IP) addresses to the computing devices at the customer premises; and provide network address translation (NAT) services for the computing devices at the customer premises.

20 Claims, 9 Drawing Sheets

(52) U.S. Cl.
CPC .... *H04L 29/12575* (2013.01); *H04L 61/2015* (2013.01); *H04L 61/2528* (2013.01); *H04L 61/2592* (2013.01); *H04L 63/0892* (2013.01); *H04L 69/324* (2013.01)

(56) References Cited

U.S. PATENT DOCUMENTS

| | | | |
|---|---|---|---|
| 9,374,267 | B2 | 6/2016 | Poirer et al. |
| 2006/0133391 | A1 | 6/2006 | Kang et al. |
| 2010/0027552 | A1 | 2/2010 | Hill |
| 2011/0158228 | A1 | 6/2011 | Dowling et al. |
| 2013/0091279 | A1 | 4/2013 | Haddad et al. |
| 2013/0121207 | A1 | 5/2013 | Parker |
| 2013/0329746 | A1 | 12/2013 | Palacios Valverde et al. |

OTHER PUBLICATIONS

Abgrall, "Virtual Home Gateway", Sep. 1, 2011, 86 pages, XP55038003.

Notification of Transmittal of the International Search Report and the Written Opinion of the International Searching Authority, or the Declaration corresponding to PCT/ES2011/070917, mailed Sep. 19, 2012, 11 pages.

Ranck, UPnP Technology—The Simple, Seamless Home Network white paper, Jun. 13, 2010, PUnP Implementation Corp, p. 4, Web link: http://upnp.org/resources/whitepapers/upnp%20technology_the%20simple,%20seamless%20home%20network_whitepaper.pdf.

Da Silva, Home Routing Gateway Virtualization: An Overview on the architecture alternatives, Jun. 2011, Future Network & Movile Summit (IEEE), pp. 1-9.

Wei, A Residential Gateway Architecture Based on Cloud Computing, Jul. 2010, Software Engineering and Services Sciences IEEE Conference, pp. 245-248.

Vlaemink, "Service Enablers for Converged IP Access Networks," Gent University, Thesis, 2008, pp. 41-58, Web link: http://citeseerx.ist.psu.edu/viewdoc/download?doi=10.1.1.118.5480&rep=rep1&type.pdf.

Abgrall, Virtual Home Gateway Study Report, Jun. 8, 2011, Eurescom, pp. 1-55. Web link: http://archive.eurescom.eu/-pubideliverables/documents/p2000-series/p2055/d1/p2055-d1.pdf.

CLOUD BASED CUSTOMER PREMISES EQUIPMENT

RELATED APPLICATION

This application is a continuation of U.S. patent application Ser. No. 13/520,500, filed Jul. 3, 2012 (now U.S. Pat. No. 9,374,267), which is a 371 application of PCT/ES2011/070917, filed Dec. 30, 2011, the disclosures of which are incorporated herein by reference.

BACKGROUND

Today's broadband service architectures tend to be heavily dependent upon the functionality of customer premises equipment (CPE) devices as a service enabler. For example, a customer, such as a business or residential customer, may purchase a number of CPE devices that may be used to obtain broadband service from a broadband service provider, such as a wireless router, a firewall, a dynamic host configuration protocol (DHCP) server, etc.

CPE devices, however, can result in a number of issues for the broadband service provider. For instance, the CPE devices can be difficult to maintain and configure for the customers, potentially resulting in a large number of customer help desk calls. Additionally, CPE devices may restrict network upgrades as a CPE device purchased by a customer may be incompatible with a new network service or protocol that the service provider may wish to implement. Additionally, functions such as network address translation (NAT) by the CPE devices may prevent visibility, by the broadband server provider, to the number and type of attached end-user devices (e.g., set-top-boxes, personal computers, laptops, tablet computers, etc.).

SUMMARY

In one implementation, a method may include receiving, over a broadband access circuit, layer 2 traffic from an access device at a customer premises. The method may further include providing DHCP services for computing devices at the customer premises, the DHCP services providing Internet Protocol (IP) addresses to the computing devices at the customer premises; and providing NAT services for the computing devices at the customer premises.

In another possible implementation, a device may include ports to receive layer 2 traffic from subscribers, at least some of the traffic being received from an access device at a customer premises, where the customer premises is connected to the device via a broadband access circuit. The device may further include one or more processors to: provide DHCP services for computing devices at the customer premises, the DHCP services providing IP addresses to the computing devices at the customer premises; and provide NAT services for the computing devices at the customer premises.

In yet another possible implementation, a system may include access devices, where each access device connects one or more computing devices, from a corresponding quantity of customer premises, to a network, using layer 2 traffic transmitted over a broadband access circuit. The system may further include a network device to receive the network connections from the access devices, the network device including an access node to aggregate the layer 2 traffic from access devices, and virtual customer premises equipment (VCPE) components to provide services to the customer premises, where the services include at least one of DHCP services that provide IP addresses to the one or more computing devices, or NAT services for the one or more computing devices.

BRIEF DESCRIPTION OF THE DRAWINGS

The accompanying drawings, which are incorporated in and constitute a part of this specification, illustrate one or more implementations described here and, together with the description, explain these implementations. In the drawings.

DETAILED DESCRIPTION

The following detailed description of the invention refers to the accompanying drawings. The same reference numbers in different drawings may identify the same or similar elements.

As described herein, a simplified switching CPE device, such as device that provides a local wireless connection and provides layer 2 switching functionality, may be installed at the premises of a broadband customer. Functions traditionally handled by CPE devices, such as firewall, layer 3 routing, and dynamic host configuration protocol (DHCP) functions, may be performed as network services. For example, an edge router maintained by the broadband service provider may provide these functions.

In one implementation, the network services described herein may be provided using virtual routers, in which each customer may be associated with a virtual router instance. The virtual router instance may provide a virtual private network (VPN) for each customer. Through the VPN, the customer may securely access, from the customer premises as well as from other access points, the services to which the customer subscribes.

Network operations discussed herein will be described as applying to packets. The term packet, as used herein, is intended to be broadly construed to include a frame, a datagram, a packet, or a cell; a fragment of a frame, a fragment of a datagram, a fragment of a packet, or a fragment of a cell; or another type, arrangement, or packaging of data.

Layer 2 traffic, as used herein, may refer to network traffic at the data link layer in the Open Systems Interconnection (OSI) reference model. The term "layer 2" may be abbreviated "L2." Similarly, layer 3 traffic, as used herein, may refer to network traffic at the network layer of the OSI reference model. The term "layer 3" may be abbreviated "L3."

Figure 1:
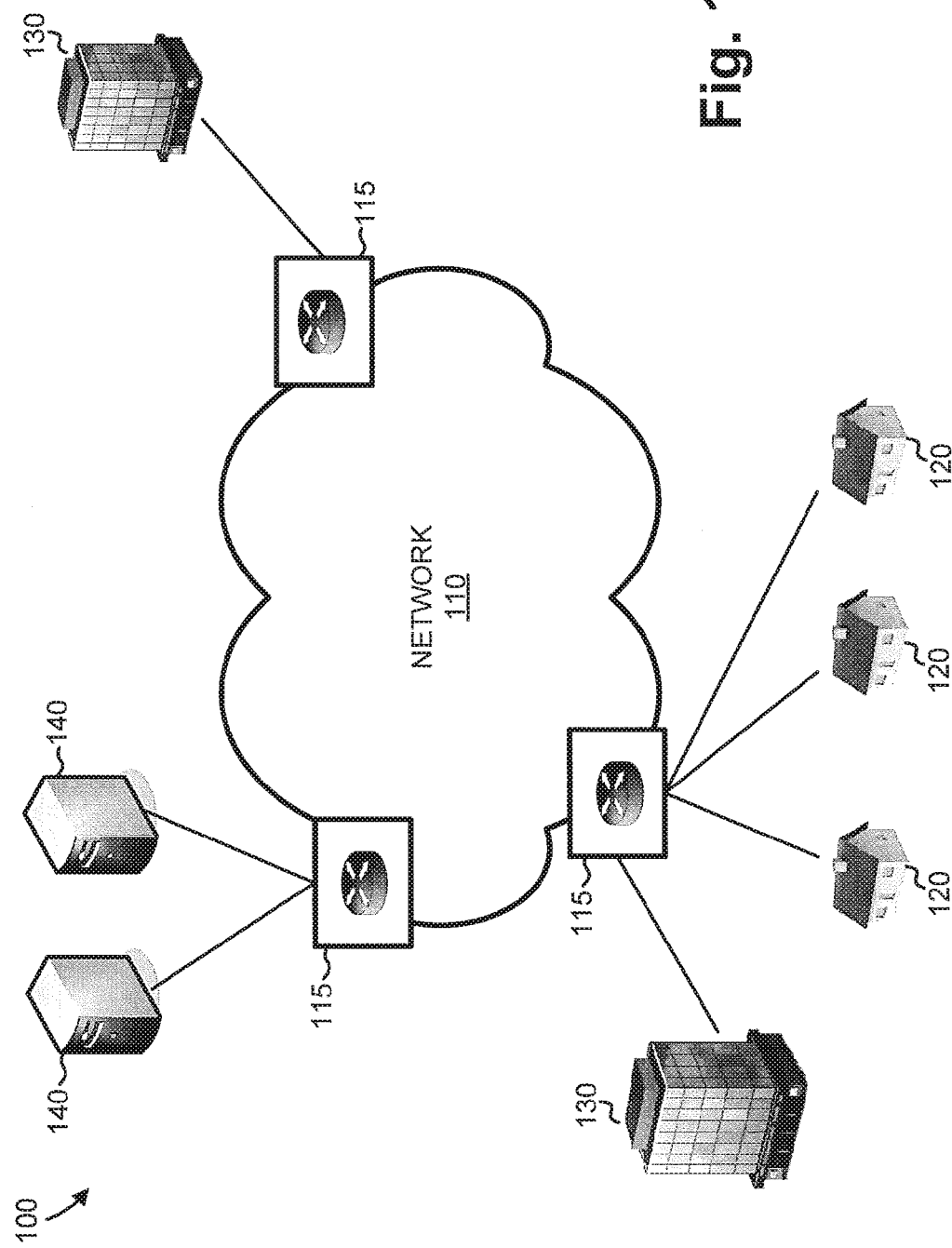
FIG. 1 is a diagram of an example system in which concepts described herein may be implemented.

FIG. 1 is a diagram of an example system 100 in which concepts described herein may be implemented. System 100 may include a network 110 that provides network connectivity to one or more customer premises, such as residential premises 120 and non-residential premises 130, as well as to other devices, such as servers 140. Residential premises 120 may each correspond to residential customers, such as a home local area network. Non-residential premises 130 may correspond to a proprietary local area network operated by a company or other organizations.

Network 110 may generally include one or more types of networks. For instance, network 110 may include a cellular network, a satellite network, the Internet, or a combination of these (or other) networks that are used to transport data. Although shown as a single element in FIG. 1, network 110 may include a number of separate networks that function to provide traffic to premises 120 and 130. Network 110 may be implemented using a number of network devices that include, for example, routers, switches, gateways, and/or other devices. As illustrated, the network devices may include edge routers 115.

Edge routers 115 may include subscriber edge routers or provider edge routers that provide routing and switching services for network 110. Edge routers 115, as described in more detail below, may perform other functions, such as firewall functions and DHCP functions for premises 120 and 130. Residential premises 120, non-residential premises 130, and servers 140, may connect, either directly or indirectly, to edge routers 115 to obtain access to network 110. Edge routers 115 may implement a number of protocols, such as a border gateway protocol (BGP), to access other networks or subscribers.

Residential premises 120 may include customers/subscribers to a broadband service provider that provides access to network 110. Residential premises 120 may connect to edge routers 115, either directly or indirectly, to obtain network access, such as home broadband access (e.g., broadband access to the Internet), via a broadband access circuit, such as digital subscriber line (DSL), fiber optic, or a cable coaxial connection. Users at residential premises 120 may connect to, and obtain services from, network 110 using a number of user devices, such as personal computers, laptop computers, tablet computers, smart phones, or other devices.

Non-residential premises 130 may include businesses, charitable organizations, or other entities. Each of non-residential premises 130 may include, for example, a private LAN. Network 110 may be used to connect non-residential premises 130 to one another and to other networks, such as the Internet. In one implementation, multiple non-residential premises 130, may connect to one another as a single virtual LAN (VLAN) connected via network 110. Users at non-residential premises 130 may connect to, and obtain services from, network 110 using a number of user devices, such as personal computers, laptop computers, tablet computers, smart phones, or other devices.

Servers 140 may each include one or more computation devices that provide services or data to residential premises 120 and/or non-residential premises 130. Servers 140 may implement, for example, web servers, data servers, search servers, cloud storage servers, media servers, or other server functions relating to the providing of data or services to residential premises 120 and/or non-residential premises 130.

Although FIG. 1 shows example components of system 100, in other implementations, system 100 may contain fewer components, different components, differently arranged components, and/or additional components than those depicted in FIG. 1. Alternatively, or additionally, one or more components of system 100 may perform one or more other tasks described as being performed by one or more other components of system 100.

Figure 2:
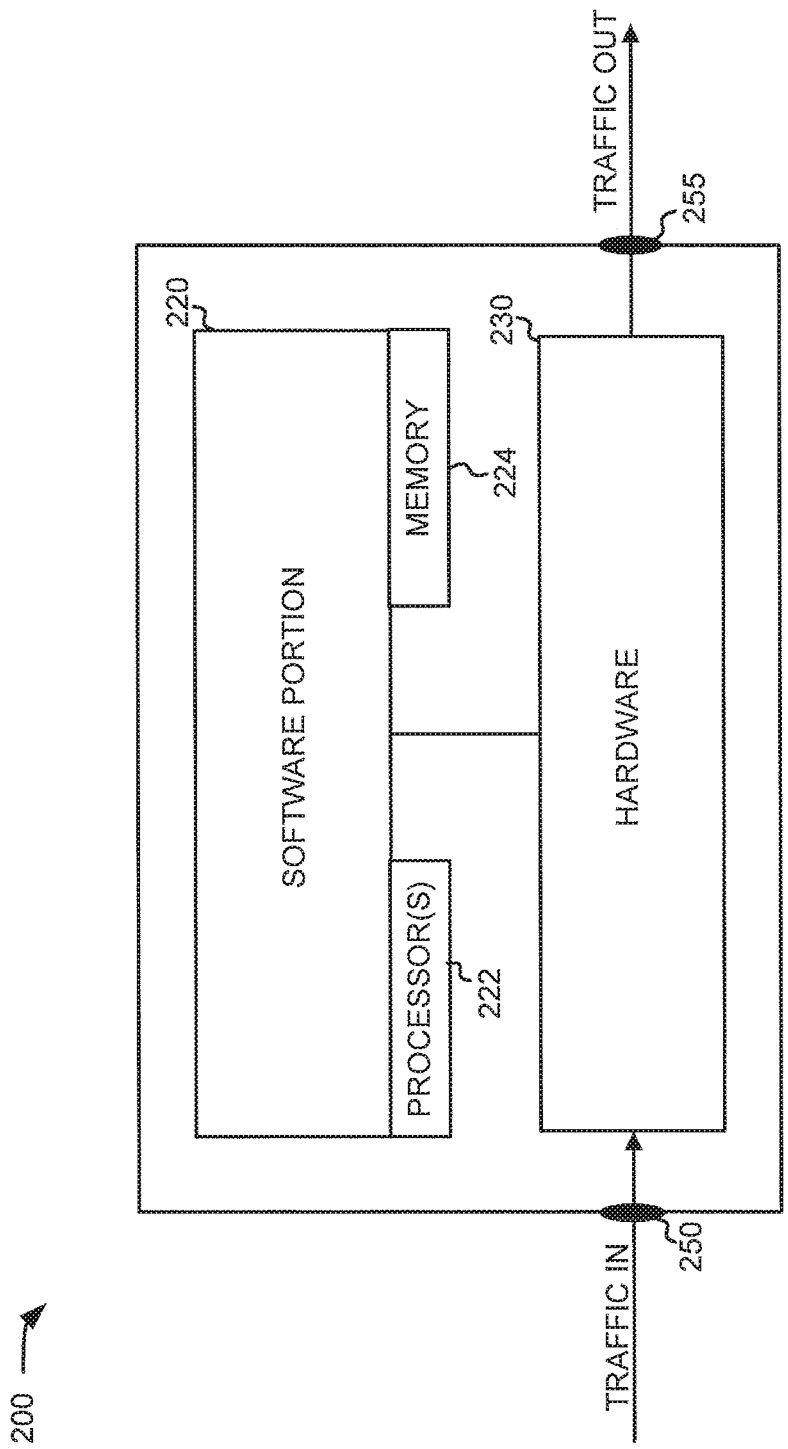
FIG. 2 is a block diagram of an example network device of FIG. 1.

FIG. 2 is a block diagram of an example network device 200, which may correspond to one of edge routers 115 or to another network device. In order to increase throughput, network device 200 may use dedicated hardware to assist in processing incoming traffic. As shown in FIG. 2, network device 200 may generally include a software portion 220 and a hardware portion 230.

Software portion 220 may include software designed to control network device 200. In general, software portion 220 may implement the functions of network device 200 that are not time critical. The functions described as being performed by software portion 220, may be implemented through, for example, one or more general purpose processors 222 and one or more computer memories 224. Processors 222 may include processors, microprocessors, or other types of processing logic that may interpret and execute instructions. Computer memories 224 (also referred to as computer-readable media herein) may include random access memories (RAMs), read-only memories (ROMs), and/or other types of dynamic or static storage devices that may store information and instructions for execution by one or more processors 222. In general, software portion 200 may perform certain functions in response to processor(s) 222 executing software instructions contained in a non-transitory computer-readable medium, such as memory 224. A computer-readable medium may be defined as a non-transitory memory device. A memory device may include space within a single physical memory device or spread across multiple physical memory devices.

Hardware portion 230 may include circuitry for efficiently processing packets received by network device 200. Hardware portion 230 may include, for example, logic, such as an application specific integrated circuit (ASIC), a field programmable gate array (FPGA), and/or a content-addressable memory (CAM). When network device 200 is a router and/or switch, hardware portion 230 may receive incoming packets, extract header information for the packets, and process the packets based on the extracted header information.

Network device 200 may additionally include one or more input ports 250 for receiving incoming network traffic and one or more output ports 255 for transmitting outgoing network traffic. In some implementations, a port may act as both or one of an input port 250 or an output port 255.

Although network device 200 is shown as including a software portion 220 and a hardware portion 230, network device 200 may, in some implementations, be implemented entirely through hardware. Additionally, network device 200 may include additional components, fewer components, different components, or differently arranged components than those illustrated in FIG. 2.

Figure 3:
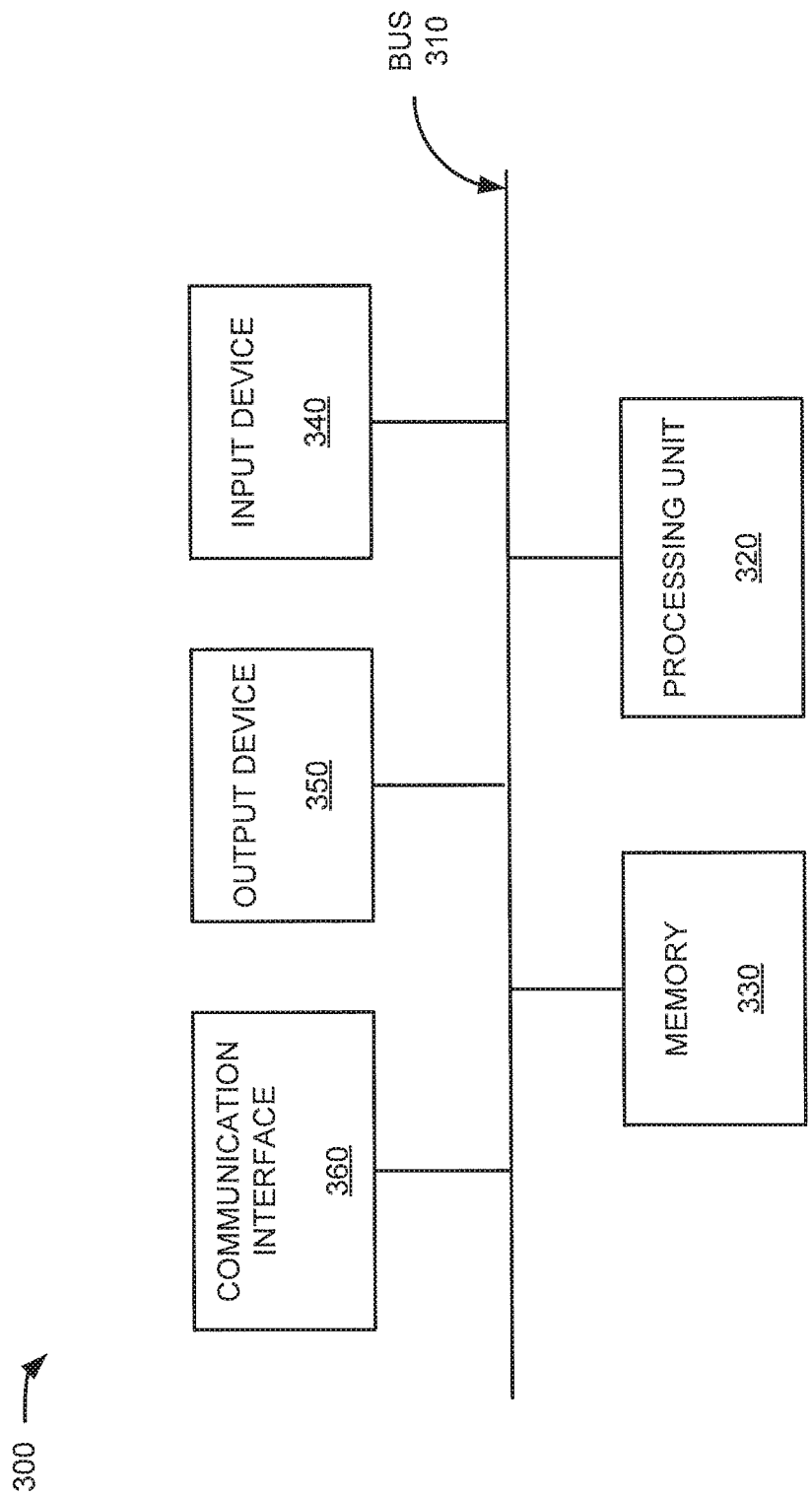
FIG. 3 is a diagram of example components of a device that may correspond to one or more, or portions of one or more, of the devices shown in FIG. 1.

FIG. 3 is a diagram of example components of a device 300 that may correspond to one or more, or portions of one or more, of the devices shown in FIG. 1, such as server 140 or computing devices located within premises 120/130. As illustrated, device 300 may include a bus 310, a processing unit 320, a memory 330, an input device 340, an output device 350, and a communication interface 360.

Bus 310 may permit communication among the components of device 300. Processing unit 320 may include one or more processors or microprocessors that interpret and execute instructions. Additionally or alternatively, processing unit 320 may be implemented as or include one or more ASICs, FPGAs, or the like.

Memory 330 may include a RAM or another type of dynamic storage device that stores information and instructions for execution by processing unit 320, a ROM or another type of static storage device that stores static information and instructions for the processing unit 320, and/or some other type of magnetic or optical recording medium and its corresponding drive for storing information and/or instructions.

Input device 340 may include a device that permits an operator to input information to device 300, such as a keyboard, a keypad, a mouse, a pen, a microphone, one or more biometric mechanisms, and the like. Output device 350 may include a device that outputs information to the operator, such as a display, a speaker, etc.

Communication interface 360 may include any transceiver-like mechanism that enables device 300 to communicate with other devices and/or systems. For example, communication interface 360 may include mechanisms for communicating with other devices.

As described herein, device 300 may perform certain operations in response to processing unit 320 executing software instructions contained in a computer-readable medium, such as memory 330. The software instructions may be read into memory 330 from another computer-readable medium or from another device via communication interface 360. The software instructions contained in memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows example components of device 300, in other implementations, device 300 may contain fewer components, different components, differently arranged components, or additional components than depicted in FIG. 3. Alternatively, or additionally, one or more components of device 300 may perform one or more tasks described as being performed by one or more other components of device 300.

Figure 4:
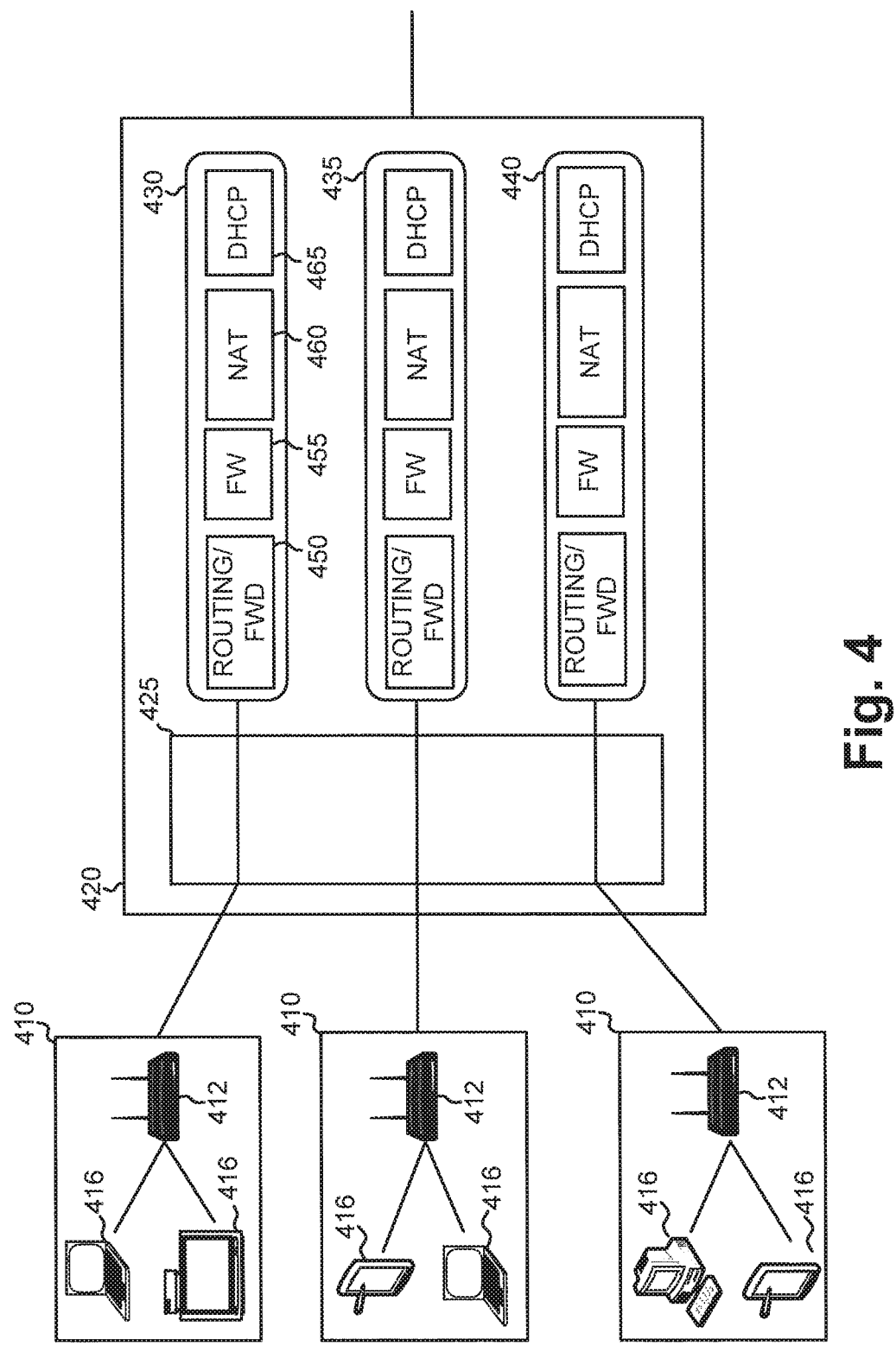
FIG. 4 is a diagram conceptually illustrating certain components of a system that relates to implementation of a cloud-based CPE environment.

FIG. 4 is a diagram conceptually illustrating certain components of system 100 that relate to the implementation of a cloud-based CPE environment. In FIG. 4, a number of premises 410 may obtain broadband services from a network device 420. Premises 410 may correspond to, for example, residential premises 120 or non-residential premises 130. Network device 420 may correspond to, for example, edge router 115 or to another device or set of devices in network 110.

Each of premises 410 may include an access device, shown as an access device 412, as well as one or more computing devices 416 that may be used by users within premises 410. In one implementation, access device 412 may include an L2 switching device that automatically connects to network device 420. Alternatively, or additionally, access device 412 may also include logic to implement a wireless LAN, such as a WiFi network. In general, access device 412 may be a relatively simple device that does not necessarily include features such as firewall services, DHCP serving services, or NAT services. This may allow access device 412 to be deployed cheaply relative to a more full-featured access device.

Alternatively, or additionally, access devices 412 may also support L3 routing. For example, instead of access device 412 connecting premises 410 to network device 420 over an L2 connection, access device 412 may connect premises 410 to network device 420 over an L3 connection.

Depending on the networking technology used to provide broadband service to premises 410, access device 412 may include functionality performed by, for example, DSL modems, cable modems, optical network terminals (ONTs), and/or optical network units (ONUs). Access device 412 may support LANs implemented using wireless technologies (e.g., 802.11b/g/n standards) or other LAN connection technologies, such as physical Ethernet connections, coaxial connections, and/or Multimedia over Coax Alliance (MoCA).

Each of premises 410 may be associated with a number of computing devices 416 that may receive broadband access through the corresponding access device 412. Example computing devices 416 are illustrated in FIG. 4 and may include: laptop computers, set-top boxes/televisions, tablet computing devices, personal computers, smart phones, etc.

Network device 420 may be a device implemented in network 110, such as at an edge router 115. Functional components of network device 420 are illustrated in FIG. 4. Network device 420 may include an access node 425. Network device 420 may implement a number of virtual routers, such as a virtual router for each of premises 410.

Access node 425 may include switching circuitry or other logic to connect the access circuits (e.g., DSL, fiber, etc.) for each of premises 410. Access node 425 may generally represent physical ports, routing logic, and/or switching logic to aggregate the access circuits associated with each premises 410 and/or each access device 412.

The functions or services implemented by network device 420, for each of premises 410, are illustrated in FIG. 4 as virtual customer premises equipment (VCPE) components 430, 435, and 440. In one implementation, each of premises 410 may be associated with a virtual LAN (VLAN). Each VCPE component 430, 435, and 440 may correspond to an instance of a virtual router that handles traffic from a particular VLAN.

VCPE components 430, 435, and 440 may provide isolation between other VCPE components. Each VCPE component 430, 435, and 440 may perform a number of functions or services relating to its traffic. Example functions are shown in FIG. 4 as routing and IP forwarding services 450 (ROUTING/FWD), firewall (FW) services 455, network address translation (NAT) services 460, and DHCP services 465. Each of the services may be implemented through, for example, software, dedicated hardware, or a combination of software and dedicated hardware.

Routing and IP forwarding services 450 may include performing L3 routing and forwarding of traffic. Firewall services 455 may use packet filters, stateful filters, or other technologies to protect premises 410 from unwanted traffic or network attacks. NAT services 460 may include services relating to modification and/or substitution of IP addresses in IP packet headers. In general, NAT may enable an increase in the number of available IP addresses in the IPv4 address space and may provide enhanced security against unsolicited inbound traffic. NAT services 460 may include carrier grade NAT (CGNAT), in which the address space assignment is centralized in the service provider network. In one implementation, NAT services 460 may share a global public IPv4 address pool between premises 410. DHCP services 465 may include services relating to the initial configuration of computing devices 416 in premises 410 and configuring the computing devices 416 to communicate on the VLAN associated with premises 410.

In some implementations, network device 420 may also support device discovery protocols, such as Universal Plug and Play (UPnP). Through UPnP, networked devices may discover each other's presence on a network and establish functional network services for data sharing and communication. UPnP may allow users to easily add devices to a LAN or VLAN in a plug-and-play manner. Network device 420, such as through VCPE components 430, 435, 440, may support discovery protocols such as UPnP.

Figure 5:
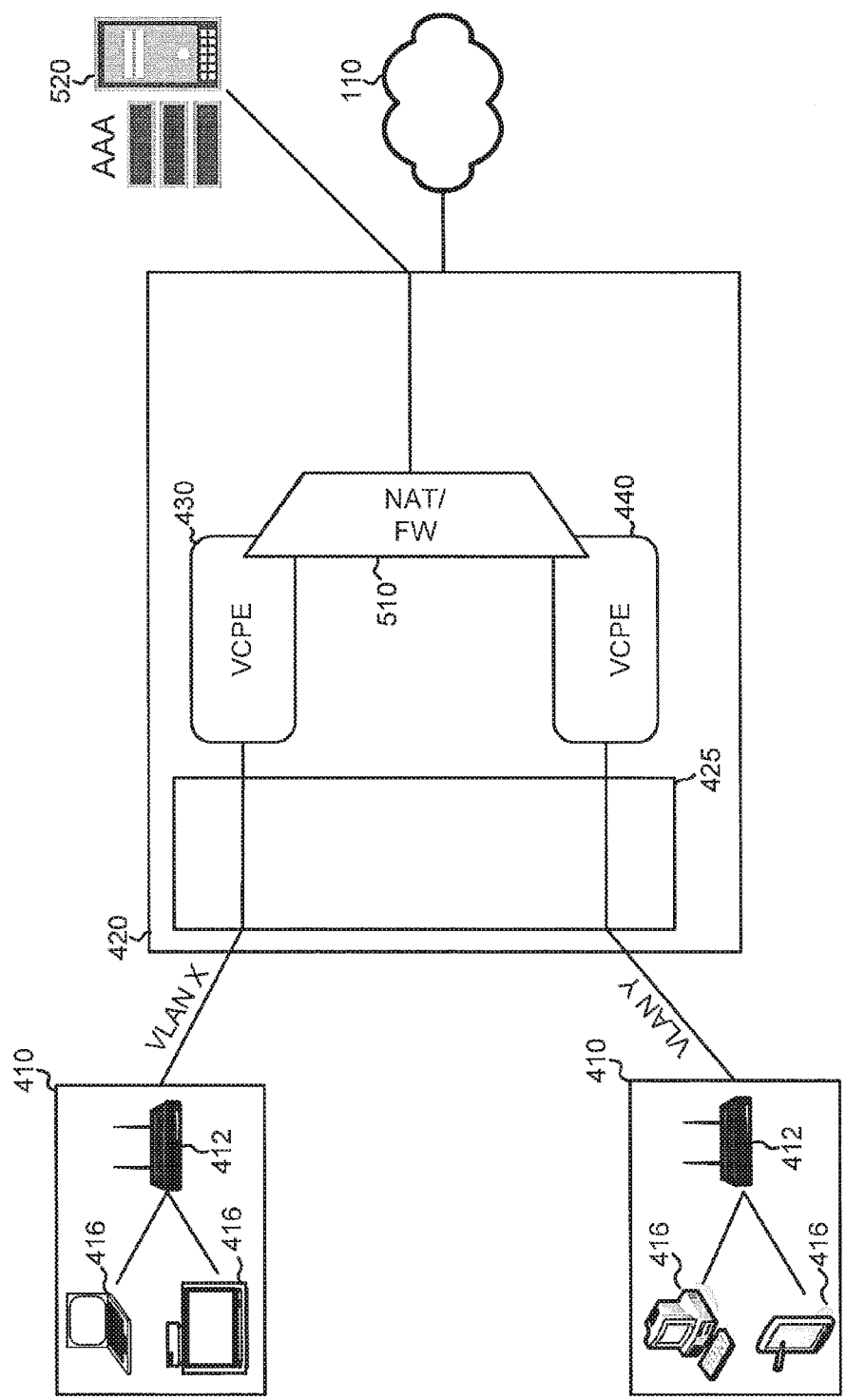
FIG. 5 is a diagram conceptually illustrating additional details relating to the conceptual components shown in FIG. 4.

FIG. 5 is a diagram conceptually illustrating additional details relating to the conceptual components shown in FIG. 4. Two premises 410 are illustrated, in FIG. 5, as connecting to network device 420. The first premises 410 may connect through a VLAN labeled as "VLAN X" and the second premises 410 may connect through a VLAN labeled as "VLAN Y." VCPE component 430 may provide services to VLAN X and VCPE component 440 may provide services to VLAN Y. As illustrated in FIG. 5, some of the services provided by VCPE component 430 and VCPE component 440 may be shared or performed on a global basis by network device 420. For example, routing and IP forwarding services 450 and DHCP services 465 may be performed as isolated services in which each of these services execute as a separate process, such as within a virtual router instance. Other services, such as firewall services 455 and NAT services 460 may be performed on a global basis by network device 420. A master VCPE component 510 may perform the global services.

With respect to the isolated services, in one implementation, each of VCPE component 430 and VCPE component 440 may correspond to virtual router instances that are maintained by network device 420. Each virtual router instance may be isolated from other virtual router instances, providing service separation and operation. Each virtual router instance may be configurable, such as by using quality of service (QoS) and DHCP parameters, which may be implemented on a per-premises basis. Additionally, in some implementations, the virtual router instances may also act as broadband network gateways (BNGs), also called broadband remote access servers (BRAS), to aggregate user sessions from each VLAN.

As is further shown in FIG. 5, network device 420 may communicate with an authentication, authorization, and accounting (AAA) server 520 to obtain AAA services relating to users at premises 410. For example, network device 420 may use passwords, unique device identification values (such as media access control (MAC) values) associated with access devices 412, or other information, to authenticate or authorize a premises 410 or a user at a premises 410. Additionally, network device 420 may communicate with AAA server 520 to perform accounting related services, such as billing an account associated with a premises 410. Additionally, AAA server 520 may store parameters relating to a premises 410, such as QoS and access control list (ACL) parameters. Additional parameters, relating to a premises 410 may be directly received from computing devices 416 at the premises 410, such as parameters received through UPnP. The parameters received through UPnP may generally be used to customize services provided to computing devices 416 or to increase service granularity. For instance, video streaming services, audio streaming services, and services provided to smart phones may be enhanced in response to the learning of device specific information, such as the video or audio capabilities of these devices.

In some implementations, VCPE components 430 and 440 may keep track of session state information on a per-computing device basis and based on the session state information, and may provide continuity of services across different computing devices 416. For instance, VCPE component 430 may monitor a video being streamed to a computing device 416. A user at premises 410 may switch computing devices 416. Based on the monitored position of the video stream, VCPE component 430 may restore the screen state, such as the location of the video, on the new (switched) computing device 416.

Although FIGS. 4 and 5 show example components of system 100 relating to cloud based CPE devices, in other implementations, system 100 may contain fewer components, different components, differently arranged components, or additional components than depicted in FIGS. 4 and 5. Alternatively, or additionally, one or more components of system 100 may perform one or more tasks described as being performed by one or more other components of system 100.

Figure 6:
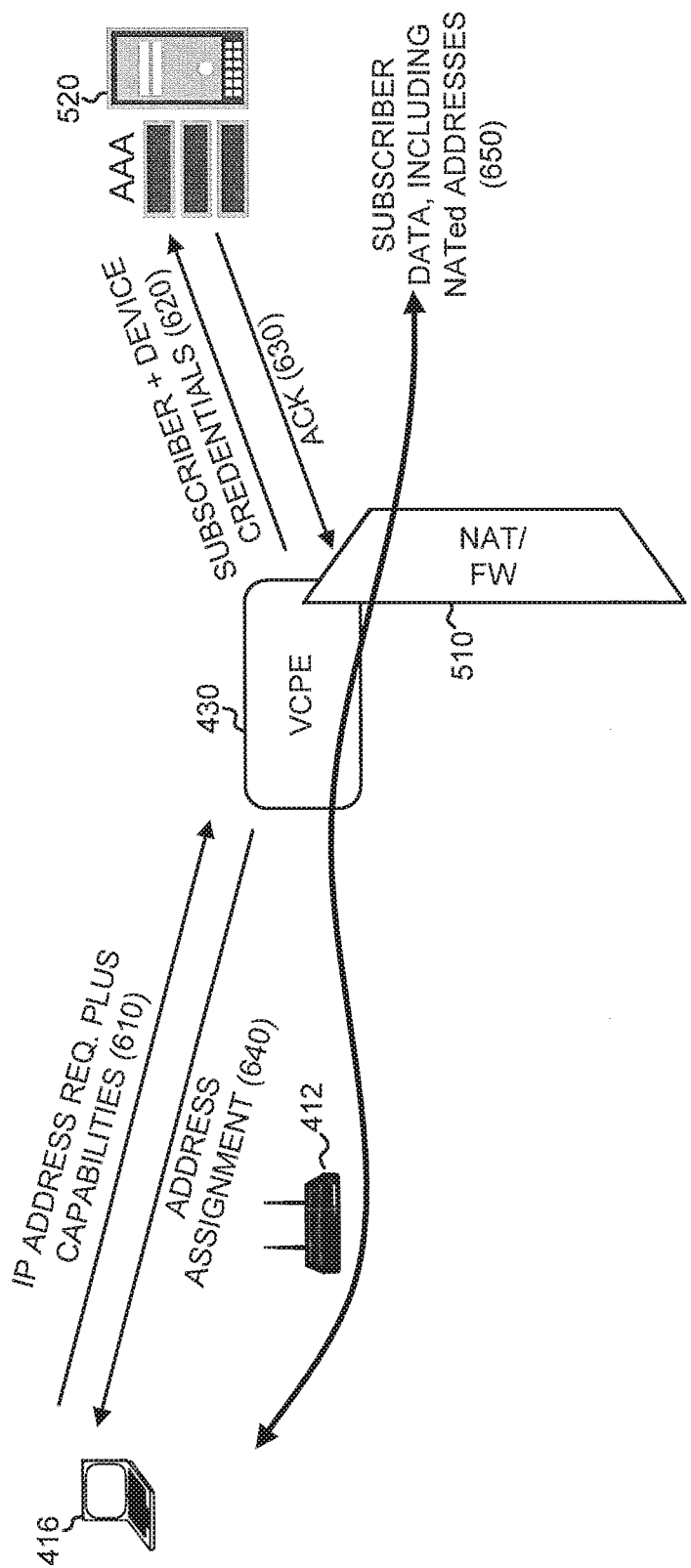
FIG. 6 is a diagram illustrating example signaling in a system that implements a cloud-based CPE environment.

FIG. 6 is a diagram illustrating example signaling in a system that implements a cloud-based CPE environment. The signaling described with respect to FIG. 6 may be implemented in the context of the components shown in FIGS. 4 and 5.

Computing device 416, such as a laptop computer, when initially turned on, may attempt to connect to its local network (communication 610; IP ADDRESS REQ. PLUS CAPABILITIES). As previously discussed, the local network may be a VLAN that extends through access device 412 and to VCPE component 430. In particular, computing device 416 may connect with DHCP services, provided by VCPE component 430, to request an IP address and, in some implementations, may provide capabilities relating to computing device 416. The capabilities relating to computing device 416 may include, for example, the screen size of computing device 416, processing abilities of computing device 416, or other abilities relating to computing device 416.

VCPE component 430 may contact AAA server 520 and may transmit subscriber and/or device credentials, such as an identifier associated with computing device 412 (communication 620; SUBSCRIBER+DEVICE CREDENTIALS). Communication 620 may be used to authenticate premises 410 or computing devices 416. The remote authentication dial-in user service (RADIUS) protocol may be used to perform the authentication. In one implementation, communication 620 may additionally include capabilities of computing device 416, such as capabilities obtained through UPnP.

AAA server 520 may respond to communication 620 with an acknowledgment response (communication 630; ACK). The acknowledgment response may indicate whether computing device 412 was successfully authenticated. In some implementations, other information, such as QoS information, firewall configuration information, ACL parameters, or other information relating to the operation of VCPE component 430, may be included in or be part of communication 630.

VCPE component 430 may determine a local IP address to assign to computing device 416 and may transmit the IP address to computing device 416 (communication 640; ADDRESS ASSIGNMENT). As previously mentioned, in one implementation, VCPE component 430 may determine the IP address using carrier grade NAT techniques, in which a global pool of IP addresses are used to assign an IP address to each computing device 416. Subsequent communications by computing device 416 may be subject to network address translation in which the assigned local IP address is translated into a public IP address for communications performed externally to the local network of computing device 416 (communication 650; SUBSCRIBER DATA, INCLUDING NATed ADDRESSES). In one implementation, certain rules pertaining to network address translation port forwarding, as performed through NAT services 460, may be configurable by a user at premises 410.

Figure 7:
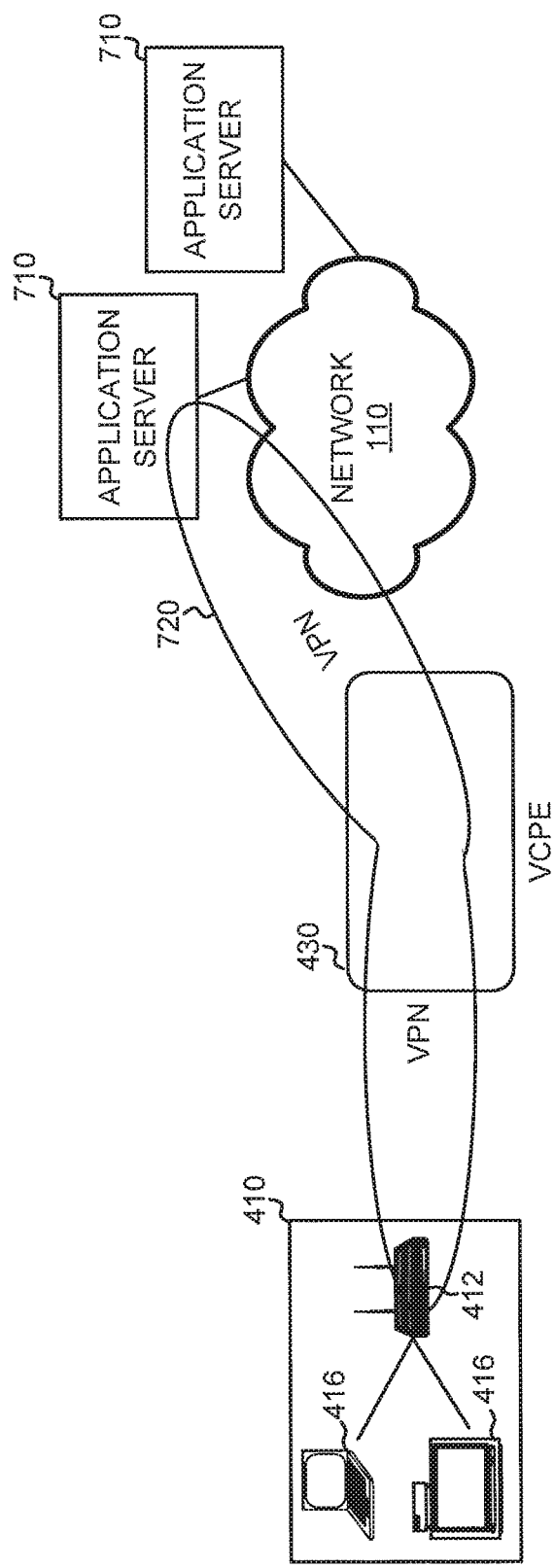
FIGS. 7 and 8 are diagrams conceptually illustrating additional components of the system of FIG. 1.

FIG. 7 is a diagram conceptually illustrating additional components of system 100. Application servers 710 may provide additional services to premises 410. Each of application servers 710 may include, for example, one or more server devices that may connect to network 110. Application server 710 may provide services such as, for instance, media services (e.g., music or video services), storage services, voice over IP (VoIP services), or other services to premises 410.

As shown, VCPE component 430, associated with a premises 410, may provide a VPN 720 with respect to computing devices 416 that are associated with premises 410 and with respect to external devices. For example, computing devices 416 and application servers 710 may be included in a single VPN by VCPE component 430. From the point of view of the users within premises 410, services provided by application servers 710 may logically appear as if application servers 710 are within the LAN of premises 410. For instance, users initially powering on a computing device 416 may not need to explicitly connect to the VPN. In one implementation, the services provided by application servers 710 may be automatically discovered by computing devices 416, such as through UPnP.

Figure 8:
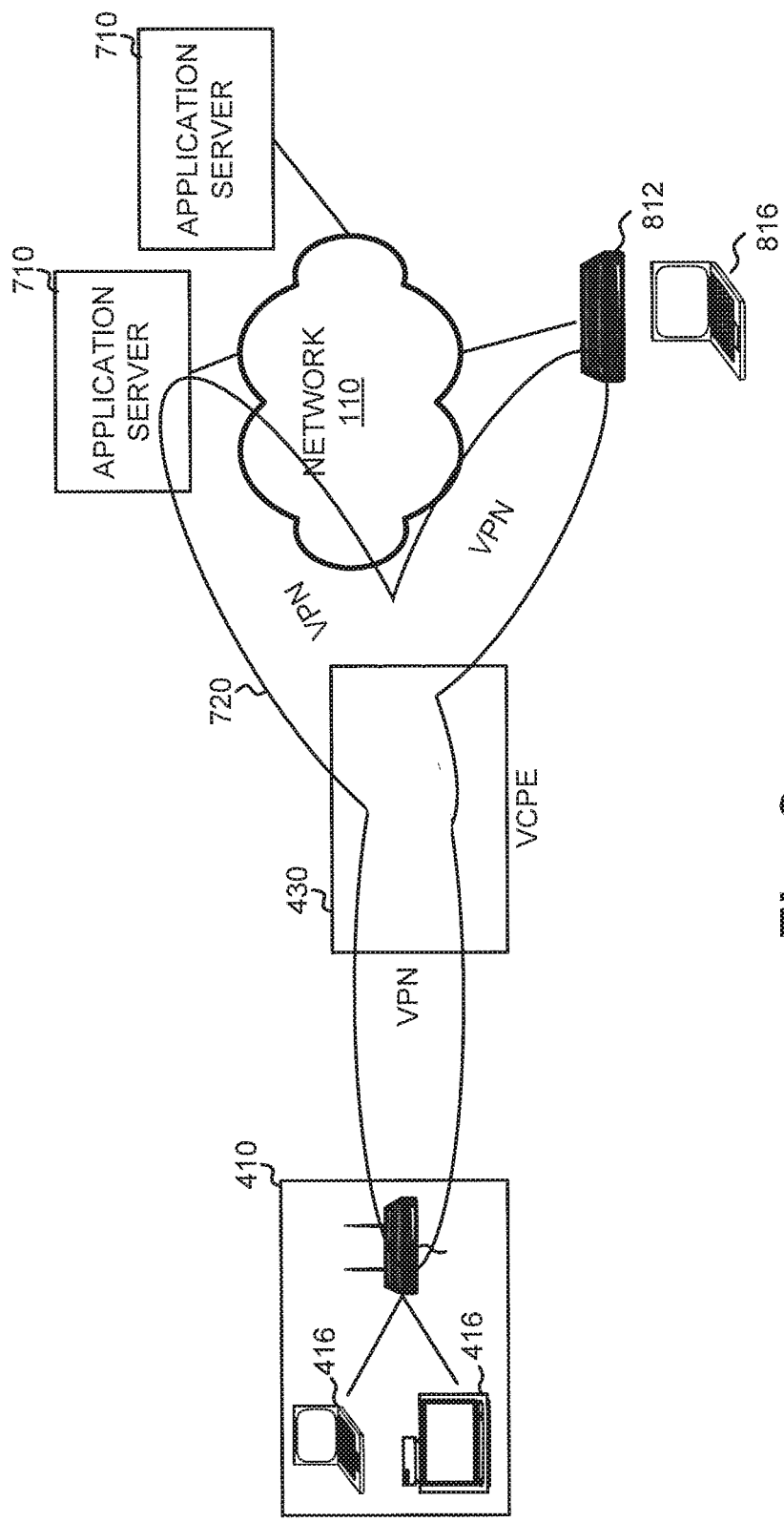

FIG. 8 is a diagram conceptually illustrating additional components of system 100. FIG. 8 is generally similar to FIG. 7, except that in FIG. 8, an additional computing device 816 and an additional access device 812 are illustrated as connecting to network 110. Computing device 816 may represent, for example, a laptop or another computing device that is associated with premises 410, such as a computing device of a user of premises 410 when the user is traveling or is otherwise away from premises 410.

Access device 812 may include a portable L2 switching device that connects to the network device that implements VCPE component 430. Access device 812 may include wireless (e.g., WiFi) and/or wired interfaces (e.g., an Ethernet port) to which computing device 816 may connect. In one implementation, access device 812 may be designed as a relatively small and portable device. Access device 812 may connect to VPN 720. By simply connecting computing device 816 to access device 812, computing device 816 may automatically obtain access to the services provided to premises 410, such as those provided by application servers 710. Additionally, through VPN 720, the geographic extent of premises 410 may be extended to share data or services. For example, images or other information stored on one of computing devices 416 may be shared with computing device 816. As another example application of VPN 720, family relatives or other associates of the users of premises 410 may be given access devices 812, allowing geographically separated families or other entities to conveniently create local computing networks.

Figure 9:
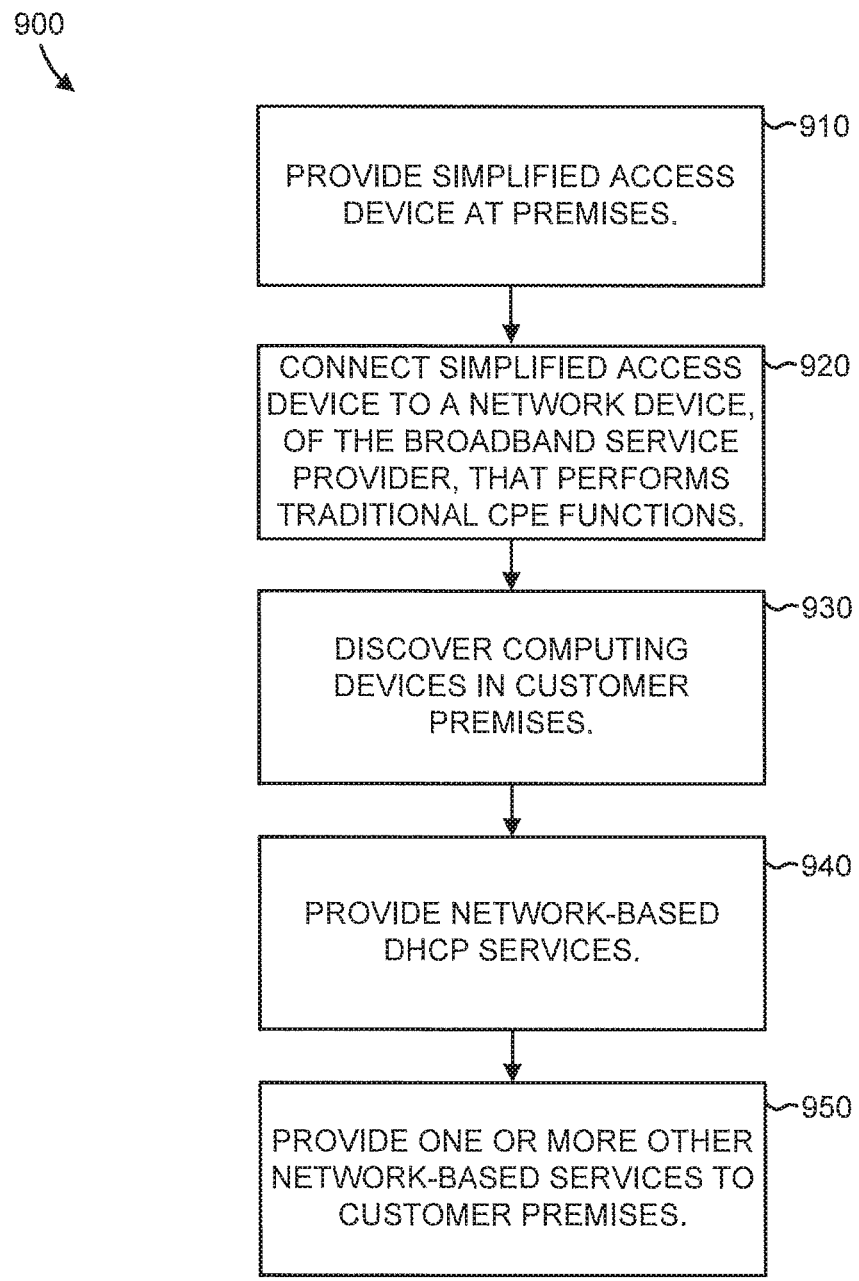
FIG. 9 is a flow chart illustrating an example process for providing network-based services.

FIG. 9 is a flow chart illustrating an example process 900 for providing network-based services. In one implementation, process 900 may be performed by combination of access devices 412 and VCPE components 430-440.

Process 900 may include providing simplified access devices to customer premises (block 910). For example, a broadband service provider may provide one or more access devices 412 to a customer. The customer or the service provider may install access device 412 at the customer premises 410. As previously mentioned, access device 412 may be an access device that includes relatively few features, such as one that provides LAN connectivity, such as through Ethernet ports and/or a local wireless connection, and a L2 connection over the broadband access circuit to network device 420. Network device 420 may include an edge router installed in the broadband provider network, such as network 110. By providing a simplified access device 412 to premises 410, access device 412 may be deployed cheaply relative to a more full-featured access device or relative to multiple access devices.

Process 900 may further include connecting the simplified access device to a network device, of the broadband service provider, that performs one or more functions traditionally performed by consumer premises equipment (block 920). For example, network device 420 may be an edge router that instantiates virtual router instances for each connecting access device 412. The virtual router instance may perform functions such as L3 routing and IP forwarding, firewall services, NAT or CGNAT services, and/or DHCP services.

Process 900 may further include discovering computing devices in the customer premises (block 930). As previously mentioned, network device 420 may include a virtual CPE component, such as VCPE component 430, that may implement a network discovery service, such as UPnP, that may automatically act to discover computing devices connected to access device 412, at a premises 410. In alternative implementations, other protocols may be used to initially discover the network provided by access device 412 and by VCPE component 430. For example, computing devices at premises 410, when initially turned on, may search its local network for a DHCP server.

Process 900 may further include providing network-based DHCP services (block 940). The DHCP services may be network-based and may be provided by VCPE component 430 at network device 420. The DHCP services may provide an IP address to each connecting computing device.

Process 900 may further include providing one or more other network-based services to the customer premises 410 (block 950). As previously mentioned, the network-based services may include routing and IP forwarding services, firewall services, and NAT services. Other services such as a media serving or data storage services, may be provided by the application servers connected to the network. A VPN may be automatically formed between network device 420 and access device 412 to enable the services, provided by the application servers, to effectively appear, from the point of view of computing devices 416, as local services.

The foregoing description of implementations provides illustration and description, but is not intended to be exhaustive or to limit the invention to the precise form disclosed. Modifications and variations are possible in light of the above teachings or may be acquired from practice of the invention.

For example, while a series of acts has been described with regard to FIG. 9, the order of the acts may be varied in other implementations consistent with the invention. Moreover, non-dependent acts may be implemented in parallel.

It will also be apparent that aspects described herein may be implemented in many different forms of software, firmware, and hardware in the implementations illustrated in the figures. The actual software code or specialized control hardware used to implement aspects described herein is not intended to limit the scope of the invention. Thus, the operation and behavior of the aspects were described without reference to the specific software code—it being understood that software and control hardware can be designed to implement the aspects based on the description herein.

Further, certain aspects described herein may be implemented as "logic" or as a "component" that performs one or more functions. This logic or component may include hardware, such as an application specific integrated circuit or a field programmable gate array, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
    receiving, by a network device and over a broadband access circuit, layer 2 traffic from an access device at a customer premises,
        the network device being located external to the customer premises;
    providing, by the network device, dynamic host configuration protocol (DHCP) services for a plurality of computing devices located at the customer premises,
        the plurality of computing devices including a first computing device and a second computing device;
    maintaining, by the network device, state information, on a per-computing device basis, for the customer premises,
        the state information indicating a state of a session; and
    providing, by the network device, continuity of services across the first computing device and the second computing device based on the state of the session and based on use of the first computing device being switched to the second computing device.

2. The method of claim 1, where receiving the layer 2 traffic includes:
    receiving the layer 2 traffic from a plurality of access devices at a plurality of customer premises,
        the plurality of access devices including the access device, and
        the plurality of customer premises including the customer premises; and
    where maintaining the state information includes:
        maintaining the state information on the per-computer device basis for each computing device at the plurality of customer premises.

3. The method of claim 2, further comprising:
    associating each of the plurality of customer premises with a different virtual local area network (VLAN).

4. The method of claim 2, further comprising:
    implementing a respective virtual private network for each customer premises of the plurality of customer premises.

5. The method of claim 1, further comprising:
    implementing a virtual private network for the customer premises,
        the virtual private network including an application server that is external to the customer premises,
        the application server providing one or more services to the customer premises, and
        the virtual private network enabling the one or more services to logically appear, from a perspective of a computing device of the plurality of computing devices located at the customer premises, as if the application server is within a local area network associated with the customer premises.

6. The method of claim 5, further comprising:
    receiving, from a location that is different than a location of the customer premises, a request from a second access device that is associated with the customer premises; and
    including the second access device in the virtual private network implemented for the customer premises.

7. The method of claim 1, further comprising:
    providing at least one of:
        firewall services for one or more of the plurality of computing devices located at the customer premises, or
        IP routing and port forwarding services for the one or more of the plurality of computing devices located at the customer premises.

8. The method of claim 1, where the network device includes an edge router in a service provider network.

9. A network device, comprising:
    one or more processors to:
        receive, over a broadband access circuit, layer 2 traffic from an access device at a customer premises,
            the network device being located external to the customer premises;
        provide dynamic host configuration protocol (DHCP) services for a plurality of computing devices located at the customer premises,
            the plurality of computing devices including a first computing device and a second computing device;
        maintain state information, on a per-computing device basis, for the customer premises,
            the state information indicating a state of a session; and
        provide continuity of services across the first computing device and the second computing device based on the state of the session and based on use of the first computing device being switched to the second computing device.

10. The network device of claim 9, where the one or more processors, when receiving the layer 2 traffic, are to:
    receive the layer 2 traffic from a plurality of access devices at a plurality of customer premises,
        the plurality of access devices including the access device, and
        the plurality of customer premises including the customer premises; and
    where the one or more processors, when maintaining the state information, are to:
        maintain the state information on the per-computer device basis for each computing device at the plurality of customer premises.

11. The network device of claim 10, where the one or more processors are to:
 associate each of the plurality of customer premises with a different virtual local area network (VLAN).

12. The network device of claim 10, where the one or more processors are to:
 implement a respective virtual private network for each customer premises of the plurality of customer premises.

13. The network device of claim 9, where the one or more processors are to:
 implement a virtual private network for the customer premises,
  the virtual private network including an application server that is external to the customer premises,
  the application server providing one or more services to the customer premises, and
  the virtual private network enabling the one or more services to logically appear, from a perspective of a computing device of the plurality of computing devices located at the customer premises, as if the application server is within a local area network associated with the customer premises.

14. The network device of claim 13, where the one or more processors are to:
 receive, from a location that is different than a location of the customer premises, a request from a second access device that is associated with the customer premises; and
 include the second access device in the virtual private network implemented for the customer premises.

15. The network device of claim 9, where the one or more processors are to:
 provide at least one of:
  firewall services for one or more of the plurality of computing devices located at the customer premises, or
  IP routing and port forwarding services for the one or more of the plurality of computing devices located at the customer premises.

16. The network device of claim 9, where the network device includes an edge router in a service provider network.

17. A non-transitory computer-readable medium for storing instructions, the instructions comprising:
 a plurality of instructions which, when executed by one or more processors associated with a network device, cause the one or more processors to:
  receive, over a broadband access circuit, layer 2 traffic from an access device at a customer premises,
   the network device being located external to the customer premises;
  provide dynamic host configuration protocol (DHCP) services for a plurality of computing devices located at the customer premises,
   the plurality of computing devices including a first computing device and a second computing device;
  maintain state information, on a per-computing device basis, for the customer premises,
   the state information indicating a state of a session; and
  provide continuity of services across the first computing device and the second computing device based on the state of the session and based on use of the first computing device being switched to the second computing device.

18. The non-transitory computer-readable medium of claim 17, where the plurality of instructions, that cause the one or more processors to receive the layer 2 traffic, cause the one or more processors to:
 receive the layer 2 traffic from a plurality of access devices at a plurality of customer premises,
  the plurality of access devices including the access device, and
 where the plurality of instructions, that cause the one or more processors to maintain the state information, cause the one or more processors to:
  maintain the state information on the per-computer device basis for each computing device at the plurality of customer premises.

19. The non-transitory computer-readable medium of claim 18, where the plurality of instructions further cause the one or more processors to:
 associate each of the plurality of customer premises with a different virtual local area network (VLAN).

20. The non-transitory computer-readable medium of claim 18, where the plurality of instructions further cause the one or more processors to:
 implement a respective virtual private network for each customer premises of the plurality of customer premises.

* * * * *